(12) United States Patent
Devigon (10) Patent No.: US 8,773,511 B2
(45) Date of Patent: Jul. 8, 2014

(54) SYSTEM AND METHOD FOR GENERATING STEREOSCOPIC IMAGE WITH CONFIGURABLE BACKGROUND OFFSET WITHIN A SYSTEM AND METHOD FOR N SHOOTING DEVICES (N>1)

(75) Inventor: Erwan Devigon, Paris (FR)

(73) Assignee: Erwan Devigon, Paris (FR)

(*) Notice: Subject to any disclaimer, the term of this patent is extended or adjusted under 35 U.S.C. 154(b) by 274 days.

(21) Appl. No.: 13/376,830

(22) PCT Filed: Jun. 8, 2010

(86) PCT No.: PCT/FR2010/051129
§ 371 (c)(1),
(2), (4) Date: Dec. 7, 2011

(87) PCT Pub. No.: WO2010/142904
PCT Pub. Date: Dec. 16, 2010

(65) Prior Publication Data
US 2012/0086786 A1 Apr. 12, 2012

(30) Foreign Application Priority Data
Jun. 8, 2009 (FR) ...................................... 09 02752

(51) Int. Cl.
*H04N 13/00* (2006.01)
*H04N 15/00* (2006.01)

(52) U.S. Cl.
USPC ................................................ 348/47; 348/42

(58) Field of Classification Search
CPC .... G02B 27/22; G02B 27/2214; G03B 35/08; G03B 35/10; H04N 13/0239; H04N 13/0003; H04N 13/0022; H04N 13/0033; H04N 13/0296
USPC ............ 348/47, 42, 46, 51, 222.1, 48; 349/15
See application file for complete search history.

(56) References Cited

U.S. PATENT DOCUMENTS

| 2011/0085789 A1* | 4/2011 | Campbell et al. ............. 396/325 |
| 2012/0113509 A1* | 5/2012 | Yamada et al. ............... 359/462 |

* cited by examiner

Primary Examiner — Robert Chevalier (57) ABSTRACT

The invention relates to a method for generating a stereoscopic image that makes it possible, when shooting an image, to modify the location of the convergence plane in the image while selecting and maintaining a constant stereoscopic offset of the upstage on the image. The method can also be used for managing the variations in focal length and in the size of the image sensors of the shooting apparatuses used while preserving the convergence point and the stereoscopic offset of the desired upstages. The invention also relates to a stereoscopic shooting system with N cameras for implementing said method. Any shooting apparatus can be used in the context of the present invention.

11 Claims, 5 Drawing Sheets

Figure 1.
process flow diagram of the flow of data throughout one specific system of the invention.

Figure 3.
diagram of one typical operating system (130)
operating on a Mx stereoscopic imaging module (100)

Figure 4.
diagram of one typical overall stereoscopic image shooting system
for the execution of the process flow of figure 1.

Figure 5.

typical representation of an ideal
Mx stereoscopic shooting module (100)

SYSTEM AND METHOD FOR GENERATING STEREOSCOPIC IMAGE WITH CONFIGURABLE BACKGROUND OFFSET WITHIN A SYSTEM AND METHOD FOR N SHOOTING DEVICES (N>1)

HISTORICAL BACKGROUND OF THE INVENTION

The intention of the present invention is to innovate in the field of stereoscopic capture, commonly called "stereo-3D shooting", technique usually consisting in photographing a scene using two cameras in order to recreate the human binocular vision. Various methods are then used to show the viewer's left eye one of the two images resulting from the method chosen, and to show the viewer's right eye the other resulting image, so that the brain juxtaposing these two distinct visions shall read a volumetric vision of the shown scene.

Prior experiments in this field were conducted more than a century ago, using early cameras, and since that age a lot of work and many devices have been made to modernize stereoscopic shooting ways and their screenings. For the brevity of this presentation, we do not make the list and we shall invite interested parties to consult the many publications referring to it.

One of the historical difficulties encountered by industries exploiting stereoscopic recording or stereoscopic shows has always been the report of some form of human brain intolerance to cope with the binocular vision when the stereoscopic image proposed do not comply with some key factors. The enumeration and the study of these key factors have generated much debates and research works in order to identify them precisely. Nowadays they are still being discussed even though much progress has led to better understandings. As a result, the industry in general is still unable to ensure that produced stereoscopic images would not generate feelings of discomfort for the average audience, neither fatigue of his eye muscles, nor headaches or dizziness. And since from one production to another the parameters involved are used in a heterogeneous field of concerns and manners, the results displays many kinds of results.

At present, the new generation of TV screens is able to display stereoscopic images and is starting to be available on the mass market, and digital projectors for movie theaters can also propose more and more stereoscopic shows. Other industries, such as medical imaging industry, for instance, show interest in stereoscopic vision. Stereoscopic vision is then likely to become the broadcast standard of tomorrow's imagery field. The inventor saw there an urgent need to provide homogeneous stereoscopic images respectful of the average human's physiological requirements.

SHORT DESCRIPTION OF THE INVENTION

The present invention proposes itself to consider a certain number of parameters and then to define a method that would allow the production of homogeneous and easy to implement stereoscopic(s) image(s). The first intention of the invention is to produce a stereoscopic image that has the characteristic of having a "specific offset of the background objects" specific to whatever convergence plane is specified. The notion of "background objects's offset" (explained below) is important since it will greatly impact on the visual comfort of resulting stereoscopic image. The inventor therefore wishes that his invention allows to control it easily so that, for instance during the capture of a stereoscopic video sequence, changes in various parameters of shooting would not affect the amount of this "background objects's offset".

In other words, part of the invention is dedicated to produce a stereoscopic image from a method which concern above all is the "background objects's offset", and which provides to this fundamental constraint the ways and means for its coexistence with the other parameters of the stereoscopic capture.

This prime concern is likely to present a paradigm shift in the art of generating stereoscopic images. Thus, in the example of using the invention for the generation of sequences of moving images, changes of one or more of the parameters used by the process dynamically produces a consistent result that would provide a greater visual comfort for the audience, as well as an easy and optimal control of the stereoscopic shootings by the industrial stereoscopic production's players. The invention allows them indeed to achieve easily and without risk any kind of movements with cameras, focal length (zoom) and scenic objects while preserving the essential qualities of a comfortable stereoscopic show. So far these movements have proved to be complicated, expensive and with hazardous results because, as explained above, in stereoscopic capture even the slightest misappreciation of involved parameters often violently strikes the physiological comfort of the audience (eye strain, headaches, nausea). The intent of the invention is to make stereoscopic image capture almost as convenient as traditional image capture.

It is meanwhile important to note that even if the inventor would wish that the use of his invention would avoid any kind of discomforts, especially among the audience, the inventor cannot however guarantee and (or) assume the responsibility of such a thing. The inventor and his designees hereby withdraw themselves from any kind of responsibility toward health risks for living beings resulting from near and far to the operation of the invention.

Figure 2:
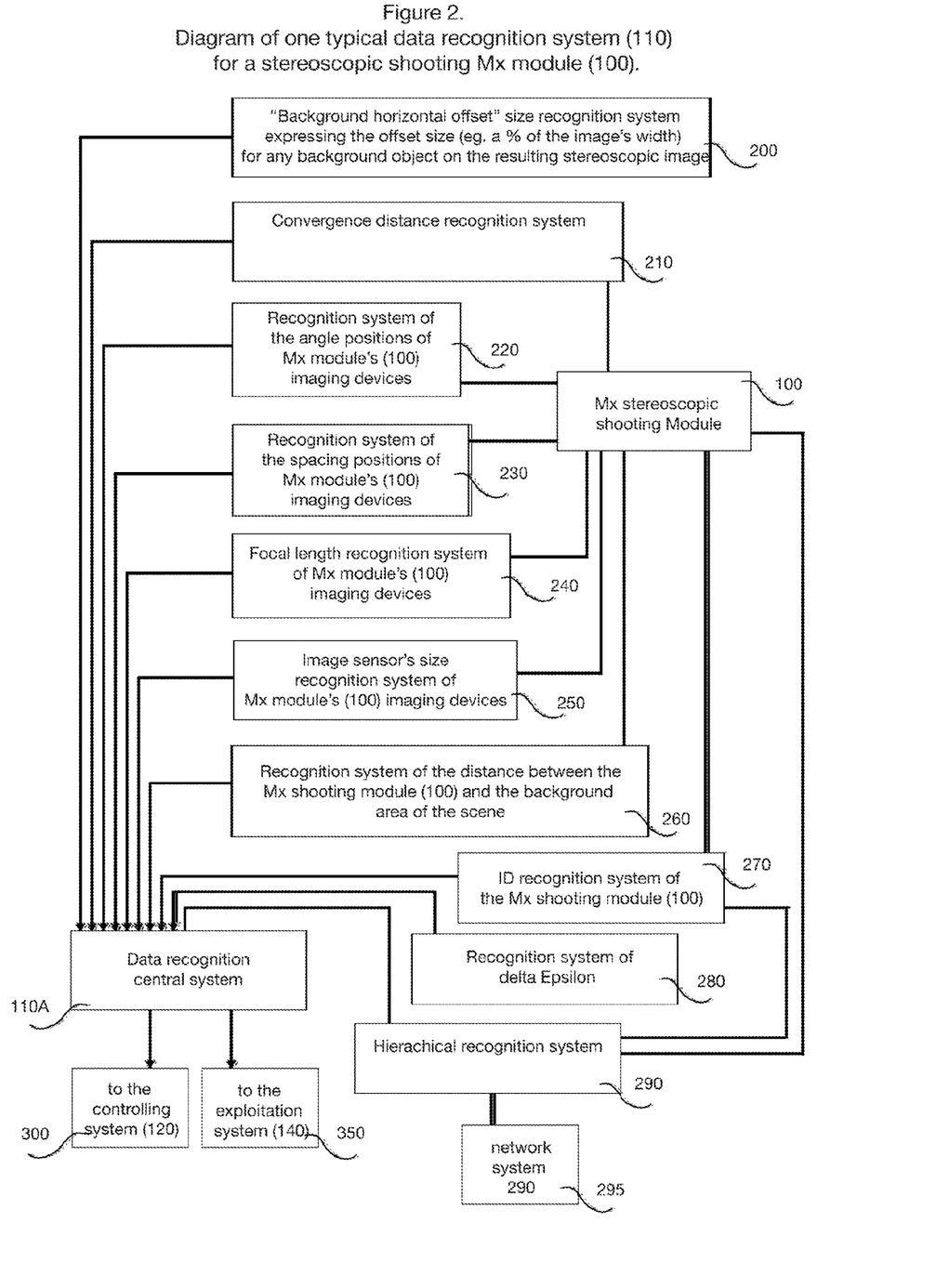
FIG. 2 is a diagram of a typical data recognition system 110 for a stereoscopic shooting Mx module 100 as conceived by some configurations of the invention. (x refers to the identifier of the module.)

According to the invention, effects of volumetric image showings for images generated by computer or capturing systems possibly assisted by computer devices are produced by the setting of distance and angle values in between or on each image capturing device belonging to one (or several) module(s). For this, a method is provided to determine these specific values in regard to several other attributes which are informed by a recognition system (FIG. 2). Then a controlling system performs specific calculations, and the produced results are transmitted to an operating system (FIG. 3) which sets them onto the module.

In each module, these attributes are:

1) For each image capturing device: the focal length. The width of the image sensor.

2) For the objects present in the scene to be pictured on the resulting stereoscopic image: The measurable distance between the module and the background of the scene that will be pictured on the resulting stereoscopic image (see details below). The desired distance between the module and the center of the convergence plane (i.e. the convergence distance) in the scene that will be pictured on the resulting stereoscopic image (eg "such character shall be on the convergence plane, the center of the convergence plane required shall then be at such distance from the module").

3) For the stereoscopic image to be generated: The size of the "background objects's offset" desired, which is the desired size of the resulting offset measurable on the resulting stereoscopic image for the stereoscopic representation of any object belonging to the background environment.

A portion of one of the methods of the invention will allow, according to these attributes, to determine the relative position of each image capturing device (with respect to the other) of a same module that is needed to produce the desired "background objects's offset" and location of the convergence plane, and then to operate the determined adjustments on the module.

Some aspects of the invention enable the variation(s) of one or more attribute(s) value(s) named above while dynamically obtaining the desired "background objects's offset" and location of the convergence plane results.

Another aspect of the invention allows in addition a further exploitation of one (or several) attribute(s) involved in the methods.

Another aspect of the invention is to implement an automated system that shall reduce production time of conform stereoscopic image sequences to real time.

Another aspect of the invention is a system that allows several modules to share one or several image capturing devices while retaining the ability of producing conform stereoscopic images. This system is also likely to operate in real time.

NOTICE OF COPYRIGHT

Portion of this document discloses algorithmic materials for which the inventor claims to be the author. All copyrights of this material are reserved by the inventor.

BRIEF DESCRIPTION OF THE DRAWINGS

In order to facilitate complete understanding of the invention, references are made to the drawings below. Given that these drawings are not to be considered as the limited scope of the invention, detailed descriptions of working models and settings are explained with references to an use of the drawings which facilitate the understanding. These drawings are.

DETAILED DESCRIPTION OF THE INVENTION

Figure 5:
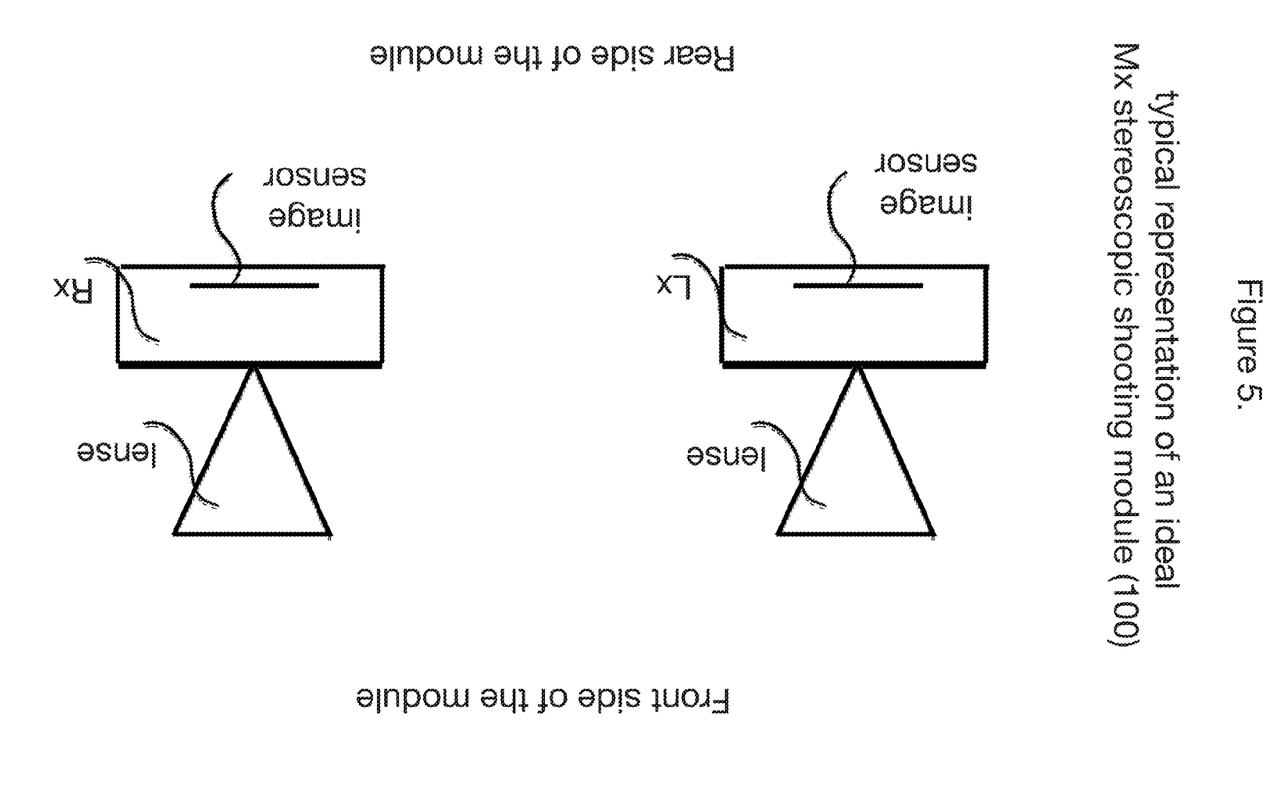
FIG. 5 is a typical representation of an ideal Mx module 100 as exploited by the invention.

Throughout the document:

is called "image capturing device" the tool assimilable with the ideal optical tool consisting of an optical device and an image sensor, and in which the optical axis is perpendicular to the plane defined by the sensor, and in which the optical center and the center of the sensor are aligned on the optical axis, and whose purpose is to produce a two-dimensional image from a scene observed by the image capturing device. The exploitation system 140 of the image produced is then, for the convenience of understanding of this document, considered independently of the image capturing device.

is called "module" the set defined as a system able to produce at least one stereoscopic image and that can be assimilated to a pair of image capturing devices. For instance a system comprising of a single image capturing device and a couple of mirrors properly arranged and oriented could be likened to a couple of image capturing devices. For ease of understanding of the invention, we will describe it using an "ideal module M" 100 consisting of a couple of image capturing devices (FIG. 5).

is called "stereoscopic image" the image that would result from the superimposition of two images captured simultaneously by the pair of image capturing devices of a module.

in every methods, the center of the image sensor of an image capturing device is the origin of an orthogonal coordinates system (X, Y, Z), where Z defines the axis linking the center of the sensor with the optical center of the device, and where Y defines the axis passing through the center of the sensor and who is parallel to the sensor's height. The origin of the coordinates system (X, Y, Z) also defines the center of rotation axes (X, Y, Z) of the device. (X, Y, Z) is the physical frame of reference of a image capturing device.

is called "middle-axis of the module" the midpoint of the imaginary segment (usually called "baseline") connecting the frames of reference of the two image capturing devices of a module M 100 (FIG. 5).

FIG. 5 is a typical representation of an ideal Mx module 100 as exploited by the invention.

The invention exploits a quantity of N modules assimilable to a quantity of N Mx modules 100 ((x relates to the identifier of the module M 100 targeted). In cases where multiple Mx modules 100 are used, one image capturing device may be shared by several Mx modules 100. For Instance, the use of three image capturing devices shall be likened to the use of two Mx modules 100 (respectively called e.g. M1 100 and M2 100) as soon as the properties of M1 100 and M2 100 meet the typical characteristics of a Mx module 100 as described below.

To simplify the understanding of the invention, the present disclosure deals with an ideal system where the Mx module 100 fits the description of FIG. 5, being understood that the Mx module 100 may be any system assimilable to a "module" as defined above, ie made up of (or virtually assimilable to) two "image capturing devices" as described above (respectively called here Lx and Rx) and able to vary the interaxial distance between Lx and Rx (baseline) by any means and able to vary the relative inclination between Lx and Rx and/or the specific angle values set on Lx and Rx (Y axis rotation) in regard to the baseline by any means, and able to transmit a stereoscopic image signal to an exploitation system 140.

In such a system Mx 100, the optical centers and the sensor centers of the imaging devices are coplanar with the plane (XZ) of one's device, ie the planes (XZ) of the imaging devices are always coplanar.

When optical axes of Lx and Rx are parallel, meaning that the planes (XY) of the imaging devices are coplanar, Lx's sensor is coplanar with Rx's sensor, and this plane defines the rear of the Mx module 100, and optical means of Lx and Rx are the front of the Mx module 100.

When the interaxial distance between Lx and Rx is greater than zero, an Observer located behind the Mx module 100, looking toward the front of module 100 Mx, can identify Lx and Rx by considering that Lx is the image capturing device on the left side of the middle-axis of the Mx module 100 and Rx is the image capturing device on the right side of the middle-axis of the Mx module 100.

In practice, if a device used to play the role of Lx or Rx has a physical frame of reference (X, Y, Z) which does not coincide exactly with the ideal physical frame of reference (X, Y, Z) as defined above, it shall still be likened to a unit of a Mx module 100, and shall be exploited by the invention as soon as the difference between the practical (X, Y, Z) and the ideal (X, Y, Z) is sufficiently small in regards the scale of the assembly formed by the Mx module 100 and the scene to be represented on the stereoscopic image so as not to disturb the measurements and calculations involved in the invention. Where appropriate, the parameter "Delta Epsilon" of the system 280 may be useful to improve the stereoscopic image result.

The usual practice of stereoscopic capture used in a Mx module 100 two image capturing devices Lx and Rx are both identical. From this sense, the usual practice of stereoscopic capture and the invention assume that, within a Mx module 100, image sensors's sizes and focal lengths of Lx and Rx are all the same and vary identically. If in practice this is not the case, it would be to to the user to perform and provide the necessary converted data so that the result of the superimposition of images from Lx and Rx would give a stereoscopic image assimilable with the resulting use of a regular Mx module 100. In every case, the more the system set up will fit to the ideal conditions described by the invention, the more the stereoscopic image produced with the invention will meet the expected quality.

Figure 1:
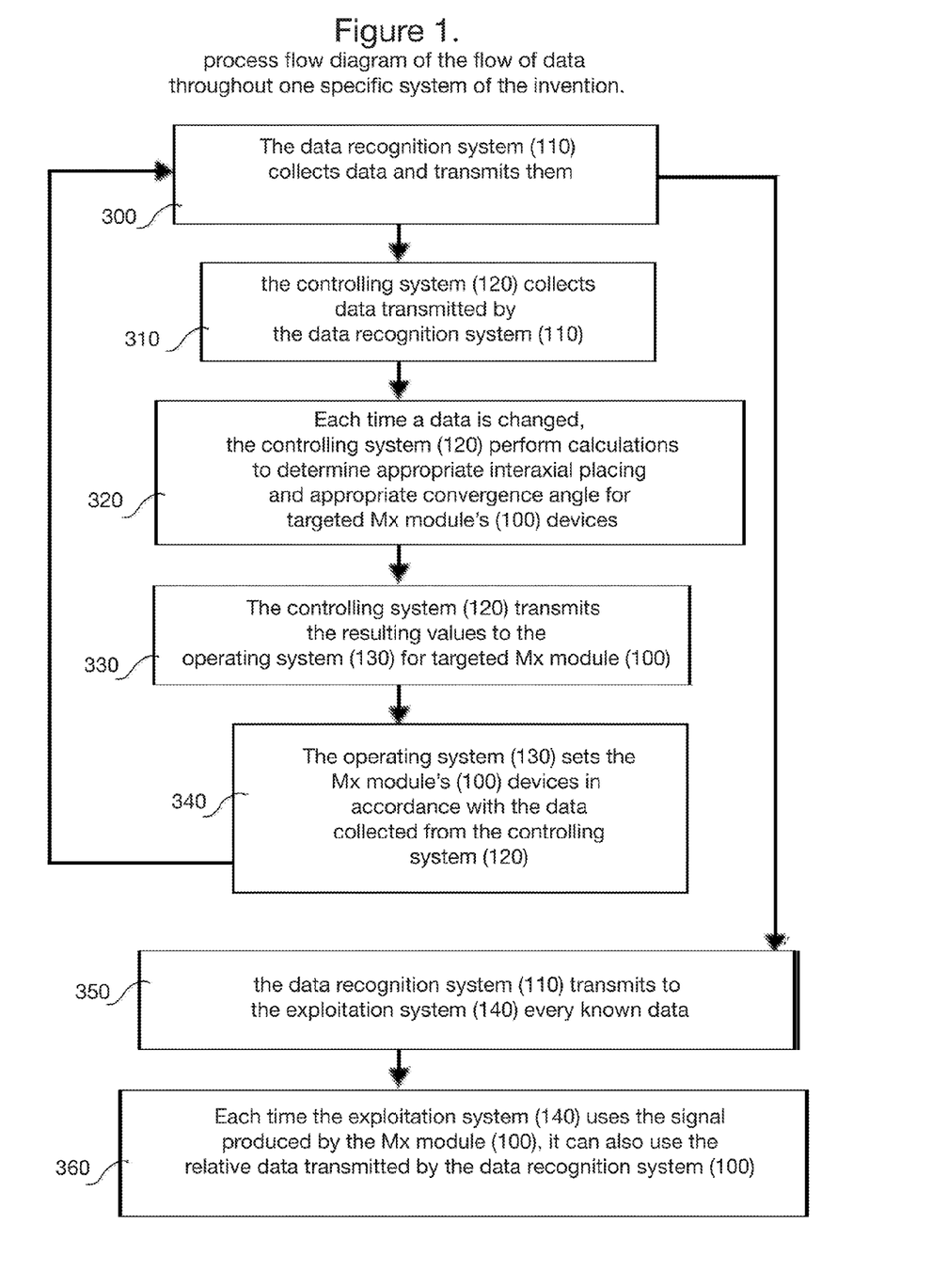
FIG. 1 is a process flow diagram of the flow of data throughout a specific system of the invention.

FIG. 1 is a process flow diagram of the flow of data throughout a specific system of the invention. The minimum configuration of such a system is described by steps 300, 310, 320, 330, 340. Subsystems involved in this method may also be capable of other faculties used in other configurations of the invention, particularly when several Mx modules 100 are nested. In this sense, the invention has a fairly broad range of applications, from simple to more complex. And for the brevity of the description, these different types of configurations are explained in a linear way rather than case-by-case, so that we expect each user to visualize what components correspond to his needs, and then to not necessarily use all the tools and methods provided by the invention.

FIG. 2 is a diagram of a typical data recognition system 110 for a shooting Mx module 100 as conceived by some configurations of the invention. (x refers to the identifier of the module.)

In the maximum context of configuration, the data recognition system 110 may be any system capable of assigning an identifier to the Mx module 100 referred, of collecting and aggregating (110A) any data relevant to the fundamental methods and of transmitting them to the controlling system 120 and to the exploitation system 140, and of communicating with other systems 290 when a network (295) of systems 290 is in place, for instance a personal computer connected to these systems. The data recognition system 110 is then the entity that includes all subsets 110A, 200, 210, 220, 230, 240, 250, 260, 270, 280 and 290. If each of the subsets 110A, 200, 210, 220, 230, 240, 250, 260, 270, 280 and 290 of the data recognition system 110 is capable of transmitting its data and the identifier(s) of the referred module(s) Mx 100 directly to the controlling system 120 and to other systems involved in the configuration chosen, then the data recognition system 110 is considered "virtual and transparent", that is to say it is virtually there as the global entity comprising subsets 110A, 200, 210, 220, 230, 240, 250, 260, 270, 280 and 290. In some configurations, the data recognition system 110 may be, for instance, a personal computer operated by a Human Being and some subsets may be directly implemented in this device, such as subsets 200 and 280.

As explained above, we consider that the usual process of a stereoscopic image would require the use of identical focal lengths and sensor sizes between the two imaging devices of a same Mx module 100. These parameters are then considered matching as pairs, meaning that the method matters the data values of only one of the two imaging devices of the referred Mx module 100, and believes that those of the other device are identical. If the settings applied to each imaging devices of a same Mx module 100 aren't identical, it would be up to the user to perform and provide the necessary converted input data so that the result of the superimposition of images giving a stereoscopic image would be conform to the use and the right processing of the method.

The system 110 has been here introduced in its optimum configuration, ie that certain qualities would sometimes be unnecessary to some uses of the invention. The following descriptions of its subsystems will take the time to make their potential uses understandable, and will then allow the deduction of the best embodiment required by each specific uses.

The Mx module 100's identifier recognition system 270 may be any system capable of assigning an identifier to the referred Mx module 100 and of transmitting this data to the data recognition system 110, for instance a personal computer. Such a system is useful when several Mx modules 100 share at least one of the systems or devices involved in the invention.

The system 110A may be any system capable of linking the data passing through it with the identifier of the module referred by the system 270 in order to properly feed the controlling system 120 if this one deals with several Mx 100, for instance a personal computer. In a minimum configuration (only one Mx module 100) it is not needed, that is why descriptions below of the system 110's subsystems would not care to mention it unless their presence makes it absolutely necessary. However, in cases where a required configuration needs the presence of a system 110A, every subsystems in the system 110 must transmit their data through a system 110A before it reaches the controlling system 120 and the exploitation system 140. The system 110A is considered virtually present if every subsystem of the system 110 is capable of accomplishing itself the task of the system 110A.

The recognition system 210 recognizing the distance between the middle-axis of the Mx module 100 and the center of the convergence plane in the scene that will be pictured on the resulting stereoscopic image may be any system capable of determining this distance and of transmitting it to the controlling system 120, for instance a Human Being with a measuring device and an interface (e.g. a personal computer) allowing him to communicate this information to the controlling system 120, or for instance an electronic focus remote control installed on the Mx module 100 if the user wants the convergence plane distance to be correlated with the focus distance.

The system 210 may also be a system able to determine the distance between any point on the baseline of the Mx module 100 and the center of the convergence plane in the scene that will be pictured on the resulting stereoscopic image and to communicate it to the controlling system 120. In this embodiment, the more the measuring point selected on the baseline would be distant to the middle-axis, the more the convergence plane finally resulting on the stereoscopic image would be different from the desired result. The user must then consider his tolerance to margins of errors before considering this embodiment. However, this last configuration does not impact the size of the "background objects's offset".

By convention, the unit of measure chosen to express the distances in the system 210 is common to both systems 230 and 260.

The recognition system 260 recognizing the distance between the middle-axis of the Mx module 100 and the background of the scene that will be pictured on the resulting stereoscopic image may be any system capable of appreciating this distance and of transmitting it to the controlling system 120, for instance a Human Being with a measuring device and an interface (e.g. an electronic dial) allowing him to communicate the data to the controlling system 120.

By convention, the unit of measure chosen to express the distances in the system 260 is common to both systems 210 and 230.

The recognition system 250 recognizing the size of the image sensor of one imaging device of the Mx module 100 may be any system capable of determining this information and of communicating it to the controlling system 120, for instance a Human Being equipped with an interface (eg a personal computer) allowing him to transmit this data to the controlling system 120. The invention cares only about the width of the sensor, it is this particular size value that has to be recognized and transmitted by the system 250. By conventions it is expressed in inches. The controller 120 assumes that the sensor size is identical for both image capturing devices of a same Mx module 100, and so it uses a single value (even if it may be variable). If the size of sensors is not the same between the two devices, the system 250 must in this case be able to know it and to calculate the relative focal length of the Rx device (for instance) so that the image captured by its sensor would match what he would capture if he had the same sensor width and the same focal length as the unit Lx, and must be also able to transmit this information to a system operating focal length settings on the Rx unit. Such a system operating focal length adjustments is not described in the drawings since the inventor considers it would hinder the ease of understanding of the invention. The original purpose of the invention is to be subservient to the focal length parameters and sensors sizes rather than constraining them. The establishment of such a system operating changes in focal length does not prevent this original purpose in stereoscopic capture, since it is only the set up of well known conversion processes. The inventor therefore finds it unnecessary to further this embodiment description, the essential point being to show that the controlling system 120 would simplify his task by receiving a single sensor width value and assuming that it is common with the two imaging devices Lx and Rx.

The recognition system 220 recognizing the (Y axis rotation) relative inclination between the two image capturing devices of a Mx module 100 and/or the (Y axis rotation) specific angle values set on the two image capturing devices of a Mx module 100 in regard to the baseline, and the recognition system 230 recognizing the interaxial distance between the two image capturing devices of a Mx module 100, may be any system capable of determining these parameters and of communicating them to the exploitation system 140, if needed, and for the system 220, to the hierarchical recognition system 290 if present, for instance a Human Being equipped with an interface (eg a personal computer) allowing him to communicate these data to the systems targeted. Many electromechanical tools are also already available to perform such tasks. The systems 220 and 230 are not present in the minimum embodiment of the invention. In the configuration where one of the imaging device of a Mx module 100 is constrained to a specific angle, the system 220 is required and has to be able to recognize this specific angle constraint and to provide it to the hierarchical recognition system 290 as well as to other above mentioned systems in the conditions also mentioned, but if the system 290 is also a system 220. In this case, the system 220 would be virtually present in a more sophisticated arrangement.

By convention, the relative and/or specific inclination is expressed in degrees in regard to the baseline, rotating in the direction of the unit circle, and the interaxial distance is expressed as the common unit of measure chosen to express the distances in systems 210 and 260.

The recognition system 240 may be any system capable of recognizing the focal length of one of the image capturing devices of a Mx module 100 and of communicating it to the controlling system 120, for instance a Human Being equipped with an interface (eg a personal computer) allowing him to communicate this data to the controlling system 120. Many electromechanical tools are also already available to perform such a task. By convention, the focal length is here in millimeters. For the same reason as outlined above in the system 250's description, the controlling system 120 simplifies his task by receiving a single focal length value since it assumes that it is shared by both imaging devices Lx and Rx. Please refer to it for further explanations.

The "background objects's offset" recognition system 200 recognizing the desired size of the resulting horizontal offset measurable on the resulting stereoscopic image for the stereoscopic representation of any object belonging to the background environment of the represented scene, may be any system capable of determining this data and to communicate it to the controlling system 120, for instance a Human Being equipped with an interface (eg a personal computer) allowing him to communicate this information to the controlling system 120. This value is expressed as a percentage of the width of the stereoscopic image to be generated (eg 2.5%).

The notion about what is called here "background objects's offset" is important for the audience's comfort. Indeed, on a stereoscopic image obtained with a Mx module 100, the geometry of the image Ax captured by the imaging device Lx differs from the geometry of the image Bx obtained by the imaging device Rx when the interaxial distance between Lx and Rx is different from zero. These differences include for instance a horizontal shift of the representation of a same object located on background environment of the scene, unless the convergence plane is set on that object. From these types of offset values would result the volumetric feeling delivered by the vision of the stereoscopic image. It is then very important to consider that, when watching a stereoscopic image, the brain could find difficulties in "merging" the stereoscopic representation of a background object if its offset's size is too large, and in this particular case it is usually considered that the stereoscopic image is uncomfortable. In addition, when the stereoscopic image is shown on a quite large screen, the offset size, even "quite" small, could be greater than 6.5 cm on the screen. This amount becomes larger than the average Human Being eye separation, and therefore it forces the average viewer's ocular system to diverge when looking at the background object. It is customary to consider that this situation may be responsible for much of discomforts and disorders heard about in stereoscopic shows, because the human ocular system can easily manage the eyes to converge but hardly make them diverge, even slightly. Thus, if it is forced to do so when watching a background object, it is also customary to consider that the stereoscopic image is uncomfortable. The "background objects's offset" is important, if only based on these arguments, but its dosage is not yet formalized because it seems to be influencing other aspects of stereoscopic imaging, and so it is often relegated as an unfortunate side issue. The inventor rejects this argument and thinks it may just be a regrettable technical lack, and therefore the invention is oriented so that the resolution of this issue is the first condition to which everything else refers. The recognition system 200 is here to get what amount would best suit the user's production desire for his stereoscopic show, and the processes used by the invention takes in charge the reliable consistency of this amount on the stereoscopic images produced by the invention whatever the values of the other parameters used during the scene shooting. The system 200 is then present in every configuration of the invention.

The Delta Epsilon recognition system 280 may be any system capable of determining this information and of communicating it to the controlling system 120, for instance a Human Being equipped with an interface (eg a personal computer) allowing him to communicate this data to the controlling system 120. Delta Epsilon is a scalar value used here to buffer the invariance of the background objects's offset, and its recommended typical value is 0.1. As embodiments of the present invention may use algorithms like one below of the disclosed which is using differential calculations methods, when the magnitude of the distance between the middle-axis of a module Mx-100 and the background of the scene that will be represented on the stereoscopic image becomes insufficiently disproportionate to the resulting interaxial spacing of the two imaging devices of the Mx module 100, as would be the case for instance when a capture is performed in a small windowless room, the correlation of the value transmitted by the recognition system 200 with the factual observed result on stereoscopic image may not be perfectly accurate if the differential calculus performed by the process in question does not change its scale of conditions. A slight variation of the factor Delta Epsilon can reset this differential. In some configurations, the presence of Delta Epsilon system 280 is then not required by the invention, for instance when the algorithm in question is able to appreciate it automatically or to do without it.

The hierarchical recognition system 290 recognizing the hierarchy of a Mx module 100 may be any system capable of locating and allocating the hierarchical position of the Mx module 100 in a system of multiple nested Mx modules 100 and of transmitting this information to the system 110A as well as to the others Mx modules 100's system 290 involved in the embodiment, for instance a Human Being with a personal computer. In other configurations of the invention the system 290 is not required, but those hereafter mentioned. The system 290 must also be connected to a system 220 capable of recognizing the specific inclination (Y axis rotation) of each imaging device of his Mx module 100, or at least the one of each unit shared with one or more other module(s) Mx 100, but if it is itself capable of performing the functions of such a system 220. If the Mx module 100 has one its units Lx or Rx that is constrained by at least one other Mx module 100 to have a specific angle, the hierarchical recognition system 290 must also be able to communicate to the controlling system 120.

In some specific embodiment of the invention where the hierarchical system 290 is necessary, an angle constraint for Lx or Rx may be present without the Mx module 100 sharing imaging device(s) with one or more other module(s) Mx 100, for instance when one of the two imaging devices of the Mx module 100 is fixed or undergoes a specific constraint, or for instance when the angle operating system 340$b$ acts only on one of the two imaging device. In these cases the system 290 does not need to be connected to other systems 290, but it must meet the other criteria of capacities above mentioned. In some configurations of the invention, the system 290 is present because one or more imaging devices of the Mx module 100 is shared with one or more other module(s) Mx. In cases where only one imaging device of module is shared, it could be better to force this unit to a fixed angle and to vary only the angles of its coupled imaging devices.

It is not mandatory in the invention because the configurations where the angle is constrained but still mobile are affordable. For Instance in the embodiment where a image capturing unit is shared by several Mx modules 100 for which a hierarchy of angle priority between the Mx modules 100 is established, and where the angle of the shared unit stays modifiable for one or more module(s) Mx 100 according to this hierarchy, which is itself modifiable and sets the constraints of particular module(s) Mx 100 according to the needs of particular module(s) Mx 100. In such a binding system, the hardware used by the entire system should be powerful enough so that the time required to accomplish all tasks involved between two image captures could match the expectations of the invention user(s).

In such binding systems, the system 290 must be able to manage and transmit the specific binding information to the system 110A, as well as being network (295) linked with the 290 systems of other existing Mx modules 100 nested with its Mx module 100.

In some configurations of the invention, a system 290 may also be shared with other modules.

Such a nested system of Mx modules 100 may have, according to the invention, an infinity of variants. It would therefore be impossible to make an exhaustive list and the inventor lets the user define the exact configuration which would suits his project. The inventor will play his part by advertising the invention in order to better display its potential. We will describe in detail below the simple configuration where a Mx module 100 shares only one imaging device with only one other Mx module 100. This configuration may be very useful for instance in the occurrence of a stereoscopic capture of an event (e.g. a football match) that would be broadcast on various size screens (TVs and giant screens for instance). In this hypothesis the producer's intention is to have a same location of the convergence plane on these different screens while having most appropriate "background offsets" for these screens. He would then choose one "background offset" size for TVs, and one smaller "background offset" size for bigger screens. For these two wished results, the resulting settings of interaxial spacing and convergence angle between the shooting devices would not be the same, and therefore he would decide to generate two different stereoscopic images from the same point of view. For this, the invention may propose to nest two Mx modules 100 in order to save one image capturing device.

In this embodiment of the invention. The module Mx 100's system 290 (let's call them for instance respectively M1 100 and system 290-1) is networked (295) to the system 290 of the other Mx module 100 (respectively system 290-2 and M2 100) because the two Mx 100 modules share one imaging device, for instance R1=L2. This system, according to the invention, may proceed as follows:

290A: Description of networking (295) of plural Mx modules 100's interconnection:

For instance the system 290-1 may send the system 290-2 the following data:

$stMx=identifier (transmitted by system 270) that defines what Mx module 100 is dealt with the following data (in this case $stMx=$stM1);

$stMxIntercom=ordered list of values (here $stMxIntercom= ($stM1, 1, 2, $stM2, 2, 0, $stM3, 0, 0, . . . , $stMn, 0, 0) defining the devices being shared with other modules; //This list is for instance of the kind. ($stM1, $L1, $R1, $stM2, $L2, $R2, . . . , $stMn, $Ln, $Rn) in a set of n Mx modules 100, where $stMn is an identifier that defines the module n of the Mx module 100 family, where $Ln is a scalar value indicating whether one module Mx is sharing one imaging device with Mn's Ln device, and where $Rn is a scalar value indicating whether one module Mx is sharing one imaging device with Mn's Rn device. For module Mn, $Ln=0 indicates that Mn does not share Ln with Mx. $Ln=1 would indicate that Ln is common to a Lx. And $Ln=2 would indicate that Ln is common with a Rx. This is the same principle for each unit of each Mx module 100. In our example, L1=L1, R1=R1, L2=R1, and R2=R2.

$stMxIntercomError=scalar value describing the state of compliance of $stMxIntercom within the network (295). A value of zero describes a compliant state. A value of 1 describes a state of system error.

290B: incoming request of Mx module 100 device slavery. The system 290 of a Mx module 100 may receive from other systems 290 on the network (295) the following data:

$stMx=identifier (transmitted by system 270) that defines what Mx module 100 is dealt with the following data (in this case $stMx=$stM1);

$stMxIntercom=ordered list of values defining the devices being shared with other modules;

$stCameraRotateYconstraintRequest=scalar value for requesting a specific angle constraint (Y axis rotation) for the imaging device shared between the two Mx modules 100. The value zero indicates that no constraint is asked. The value 1 indicates that a constraint is asked for Lx. The value 2 indicates that a constraint is asked for Rx;

$stCameraRotateYconstraint=scalar value (transmitted by system 220) indicating whether an imaging device in the Mx module 100 undergoes a specific angle constraint (Y axis rotation). The value zero indicates that no device is constrained. The value 1 indicates that Lx is constrained. The value 2 indicates that Rx is constrained;

$stConstraintAngle=scalar value (transmitted by system 220) of the angle (Y axis rotation) of the optical axis of the device constrained in regard to the baseline, rotating in the direction of the unit circle;

If the system 290 is in "imperative master" mode, he responds immediately $stConstraintAngleAnswer=0;

if not:

The system 290 checks that $stMxIntercom is compliant with its own $stMxIntercom;

if ($stMxIntercomError==1)

```
{
the system 290 sends its own $stMx and $stMxIntercomError = 1 to all other system 290
in the network (295) and also to the controlling system 120 to indicate that $stMxIntercom
is in system error state ;
}
else
{
the system 290 sends its own $stMx and $stMxIntercomError = 0 to all other system 290
in the network (295) and also to the controlling system 120 ;
        if      ($stCameraRotateYconstraintRequest == 0)
        {
                if              ($stCameraRotateYconstraintReserveMxID == $stMx)
                {
                        $stCameraRotateYconstraintReserveMxID = 0;
                        $stCameraRotateYconstraint = 0;
                        the system 290 sends its own $stMx and$stCameraRotateYconstraint
to the controlling system 120 ;
                }
        }
        else
        {
                if              ($stCameraRotateYconstraint > 0)
                {
                        if      ($stCameraRotateYconstraintReserveMxID== $stMx)
                        {
                        the system 290 sends its own $stMx and$stCameraRotateYconstraint
to the controlling system 120 ;
                        the system 290 sends its own $stMx and $stConstraintAngle to the
controlling system 120 ;
                        }
                        else

{
``` the system 290 sends its own $stMx and $stConstraintAngleAnswer=0 followed by its $stMxIntercom and $stCameraRotateYconstraintReserveMxID=$stMx to the system 290 who sent the request so that it addresses its request to the Mx module 100 currently master of the shared imaging device; //Logically the application would already have been sent to all Mx modules 100 in the network that is using this device, and thus sending $stCameraRotateYconstraintReserveMxID=$stMx in complement of response would be obsolete. However, it facilitates here the understanding of this part of the invention.

```
                        }
                }
        else
        {
                if      ($stCameraRotateYconstraintReserve == 1)
                {
                        if      ($stCameraRotateYconstraintReseveMxID =
                                $stMx)
                        {
                                $stCameraRotateYconstraint =
$stCameraRotateYconstraintRequest ;
                                the system 290 sends its own $stMx and
$stCameraRotatcYconstrairit to the controlling system 120 ;
                                the system 290 sends its own $stMx and
$stConstraintAngle to the controlling system 120 ;
                        }
                        else
                        {
                                the system 290 sends its own $stMx and
$stConstraintAngleAnswer = 0 to the system 290 who sent
the request ;
                        }
                }
                else
                {
                        $stCameraRotateYconstraintReserve = 1;
                        $stCameraRotateYconstraintReserveMxID =
                        $stMx ;
```

-continued

```
   the system 290 sends its own $stMx and
$stConstraintAngleAnswer = 1 to the system 290 who sent the
request ;
      }
    }
  }
}
```

290C: request to enslave another Mx module 100 device:
The system 290 may find an internal request to switch on the "master" mode;
if ($stCameraRotateYconstraint==0)

```
{
  the system 290 reads $stMxIntercom to consider the possibility of enslavement ;
  the system 290 find the module that shares the imaging unit ;
  the system 290 defines the $stCameraRotateYconstraintRequest in accordance with
the chosen option ;
  $stCameraRotateYconstraint = $stCameraRotateYconstraintRequest;
  $stConstraintAngle = scalar value (transmitted by system 220) of the angle (Y axis
rotation) of the optical axis of the shared imaging device in regard to the baseline, rotating
in the direction of the unit circle ;
  the system 290 sends the targeted system 290 his own $stMx followed by:
  $stMxIntercom ;
  $stCameraRotateYconstraintRequest ;
  $stCameraRotateYconstraint :
  $stConstraintAngle ;
  As soon as is received from the targeted system 290 a $stConstraintAngleAnswer =
1 :
  the system 290 updates $stConstraintAngle ;
  the system 290 sends to the targeted system 290 its own $stMx followed by :
  $stMxIntercom ;
  $stCameraRotateYconstraintRequest ;
  $stCameraRotateYconstraint ;
  $stConstraintAngle ;
  the system 290 shall redo the process 290C every time it sees an angle change on
the shared device ;
{
else
}
the system 290 waits to receive new orders (290B) from its mastering system 290 ;
as soon as received, it answers $stCameraRotateYconstraintAnswer = 0 in order to get
freedom and then goes int "imperative master" mode ;
the system 290 sends its controlling system 120 its own $stMx followed by
$stCameraRotateYconstraint = 0 ;
the system 290 redoes the process 290C ;
}
```

290D: Request to exit from "master" mode:
The system 290 may read an internal request to switch off "master" mode;
$stMaster=0;

The controlling system 120 may be any processor capable of receiving the data delivered by the recognition system 110 and then of computing the algorithms 320 necessary to determine the corresponding results to adjustments that should be made by the operating systems 340a and/or 340b, and then of transmitting them to the operating system 130. Such a system 120 may be, for instance, a personal computer. The system 120 is present in every embodiment of the invention. In some embodiments of the invention, the system 120 may be shared with other systems 110, in such cases the presence of system 270 is required.

Step 310 (FIG. 1): According to the invention, the controlling system 120 may receive from the recognition system 110 and process the following data (or only part of, as the context requires):
$stMx=identifier (transmitted by system 270) that defines what Mx module 100 is dealt with the following data; //$stMx is optional. If the controlling system 120 does not receive information about $stMx, it considers that it has to manage a single Mx module 100 and sends its result without this ID.
$stMxIntercomError=scalar value 0 or 1 (transmitted by system 280) that defines whether the system is in error state.
$stCFL=scalar value (transmitted by system 240) of the focal length of one of the image capturing device of the Mx module 100;
$stCHap=scalar value (transmitted by system 250) of the width of the image sensor of one of the image capturing device of the Mx module 100;
$stPC=scalar value (transmitted by system 200 and here expressed in %) of the desired size of the resulting horizontal offset on the resulting stereoscopic image for the stereoscopic representation of any object belonging to the background environment of the represented scene;
$stEpsilon=scalar value (transmitted by system 280) of Delta Epsilon;
$stFp=scalar value (transmitted by system 260) of the distance between the middle-axis of the Mx module 100 and the background of the scene that will be pictured on the resulting stereoscopic image;
$stZpp=scalar value (transmitted by system 210) of the distance between the middle-axis of the Mx module 100 and the center of the convergence plane in the scene that will be pictured on the resulting stereoscopic image;
$stCameraRotateYconstraint=scalar value (transmitted by system 220) indicating whether an imaging device in the Mx module 100 undergoes a specific angle constraint (Y axis rotation). The value zero indicates that no device is constrained. The value 1 indicates that Lx is constrained. The value 2 indicates that Rx is constrained;
$stConstraintAngle=scalar value (transmitted by system 220) of the angle (Y axis rotation) of the optical axis of the constrained imaging device in regard to the baseline, rotating in the direction of the unit circle;

If $stMxIntercomError=1 then the controlling system 120 communicates a system error signal and does not continue the process;
Otherwise:
//At system ignition, all data above would be zero and the controlling system would not launch any of the following actions as long as it would not receive at least one non-zero data for one of following parameters: $stCFL, $stCHap, $stPC, $stEpsilon, $stFp and $stZpp. These parameters are the parameters needed by the minimum mode of the method.//

The controlling system 120 archives all the new data available;
If a previous value for each of the new data about this Mx module 100 is already stored by the controlling system 120, it compares each of them;
Step 320 (FIG. 1):
If and only if at least one parameter value has changed, the controlling system 120 stops unfinished (if any) Step 320's calculus related to this Mx module 100, and then it may perform the following method:
The new value(s) crush(es) old value(s) in the archives;

```
$stAngleDeChamp    =    2 * atand(25.4*$stCHap/(2*$stCFL)) ;
if      ($stFp == 0)
        {
                        $stFp = 0.001 ;
        }
if      ($stAngleDeChamp == 180)
        {
                        $stAngleDeChamp = 179.99 ;
        }
        $stT        =   tand($stAngleDeChamp * 0.5) ;
        $stA        =   (1 + $stPC/100) * $stT ;
        $sta        =   $stT - $stA + 0.5*$stEpsilon/$stFp ;
                        if      ($sta == 0)
                                {
                                        $sta = 0.001 ;
                                }
        $stb        =   $stA * $stT - 0.5*$stEpsilon/$stFp - $stZpp/$stFp + 1 ;
        $stc        =   $stT * $stZpp / $stFp ;
        $stD        =   $stb * $stb - 4*$sta*$stc ;
if      ($stD<0)
        {
                        $stAngleAlpha = 90 ;
        }
else
        {                       if          ($stD == 0) // calcul de X=X0
                                {           $stX0 = -$stb/(2*$sta) ;
                                    if      ($stX0 == 0)
                                            {
                                                    $stX0 = 0.01 ;
                                            }
                                    if      ($stX0 == 90)
                                            {
                                                    $stX0 = 89.99 ;
                                            }
                                    $stAngleAlpha = abs(atand($stX0)) ;
                                }
                                else
                                {           $stX1 = (-$stb - sqrt($stD))/(2*$sta) ;
                                            $stX2 = (-$stb + sqrt($stD))/(2*$sta) ;
                                            if          ($stX1 == 0)
                                                    {   $stX1 = 0.01 ;
                                                    }
                                            if          ($stX1 == 90)
                                                    {   $stX1 = 89.99 ;
                                                    }
                                            if          ($stX2 == 0)
                                                    {   $stX2 = 0.01 ;
                                                    }
                                            if          ($stX2 == 90)
                                                    {   $stX2 = 89.99 ;
                                                    }
                                            $stAngleAlpha1 = atand($stX1) ;
                                            $stAngleAlpha2 = atand($stX2) ;
                                                    if    ( (90 - abs($stAngleAlpha1)) < (90 - abs($stAngleAlpha2)) )
                                                          {        $stAngleAlpha = abs($stAngleAlpha1) ;
                                                          }
                                                    else
                                                          {        $stAngleAlpha = abs($stAngleAlpha2) ;
                                                          }
                                }
        }
                if      ($stAngleAlpha == 90)
                        {       $stAngleAlpha = 89.99 ;
                        }
        $stdc              =            abs(2 * $stZpp / tand($stAngleAlpha)) ;
        $stRelativeAngle   =            (180 - (2 * $stAngleAlpha)) ;
                if      ($stCameraRotateYconstraint == 1)
                        {       $stCamLeftRotateY =         $stConstraintAngle ;
                                $stCamRightRotateY          =       ($stConstraintAngle + $stRelativeAngle ) ;
```

-continued

```
            }
    else
            {       if      ($stCameraRotateYconstraint == 2)
                    {       $stCamLeftRotateY =     ($stConstraintAngle −
$stRelativeAngle );
                            $stCamRightRotateY      =
    $stConstraintAngle ;
                    }
                    else
                    {       $stCamLeftRotateY =     $stAngleAlpha ;
                            $stCamRightRotateY      =       (180 −
$stAngleAlpha ) ;
                    }
            }
```

Results Exploitation:
The controlling system 120 stores $stMx (if any), $stdc, $stRelativeAngle, $stCamLeftRotateY and $stCamRightRotateY and if there are older stored values for these parameters it overwrites them;

Step 330 (FIG. 1): The controlling system 120 transmits to operating system 130 the results below:

```
select $stMx ; // if any.
{
setAttr "stereoCameraLeft.rotateY"       $stCamLeftRotateY ;
setAttr "stereoCameraRight.rotateY"      $stCamRightRotateY ;
or
setAttr "stereoCameraRelativeAngle"      $stRelativeAngle ;
}
setAttr "stereoCameraInteraxialSeparation"   $stdc ;
unselect $stMx ; // if any.
``` where $stMx is the identifier (transmitted by system 270) that defines what Mx module 100 is dealt with the parameter settings to be performed (in the case where the operating system 130 is shared by several Mx modules 100), where $stCamLeftRotateY is the scalar value of the angle (Y axis rotation) of the optical axis of Lx device in regard to the baseline, rotating in the direction of the unit circle, where $stCamRightRotateY is the scalar value of the angle (Y axis rotation) of the optical axis of Rx device in regard to the baseline, rotating in the direction of the unit circle, where $RelativeAngle is the scalar value of the angle (Y axis rotation) between optical axes of Lx and Rx if system 100 need it (rare), and where $stdc is the scalar value of the interaxial distance between the two image capturing devices of the Mx module 100.

Figure 3:
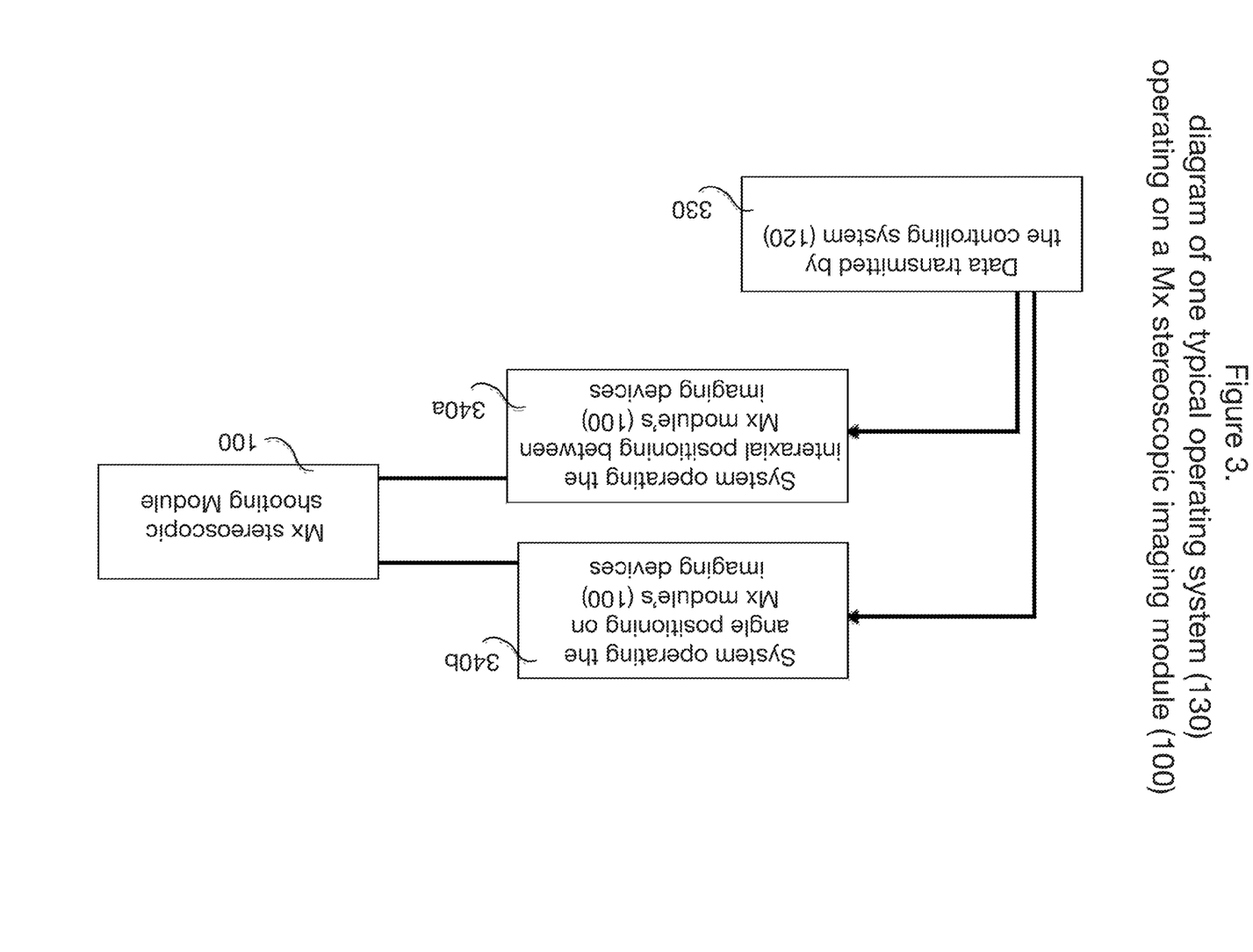
FIG. 3 is a diagram of the operating system 130 for a stereoscopic shooting Mx module 100 as conceived by some configurations of the invention. (x refers to the identifier of the module.)
Figure 4:
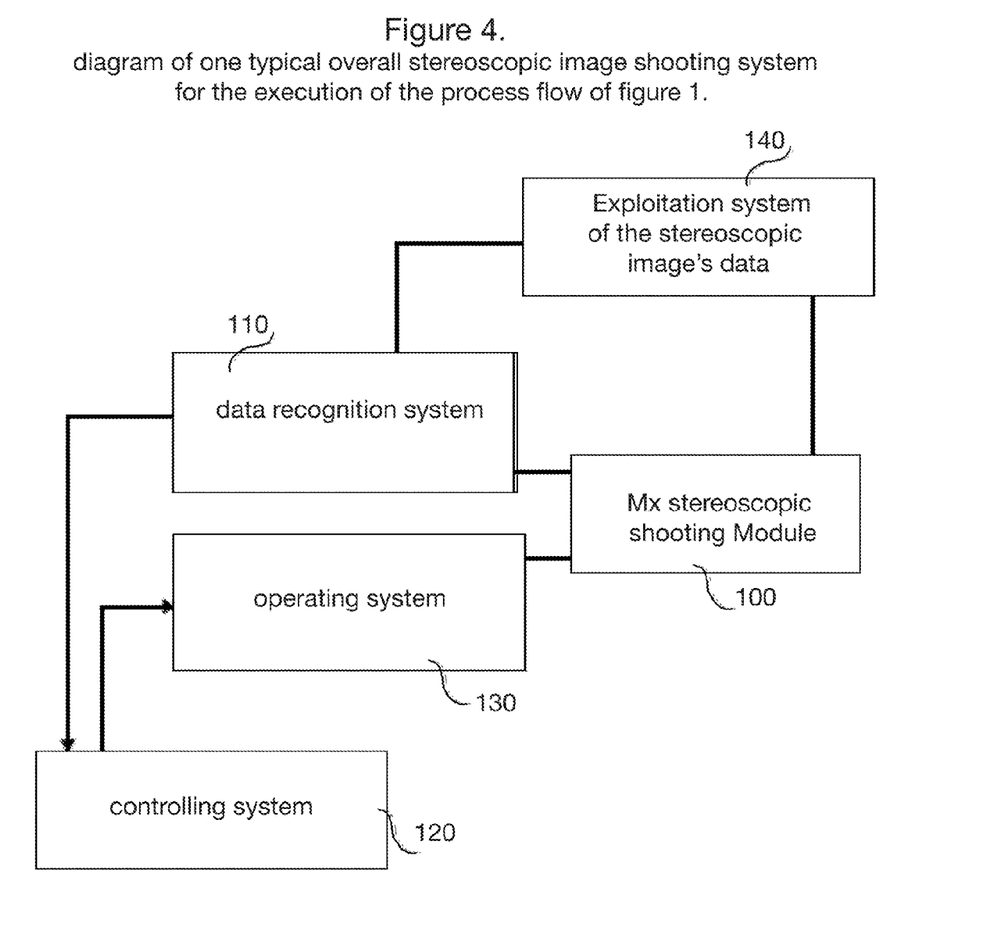
FIG. 4 is a diagram of the typical overall system for the execution of the process flow of FIG. 1.

Step 340:

The operating system 130 and its subsystems 340a and 340b may be any systems capable of collecting data from the controlling system 120 and of implementing them on the Mx module 100, for instance a Human Being equipped with an interface (e.g. a personal computer) connected to the controlling system 120. Many electromechanical tools are also already available to perform such tasks. The system 130 is present in every embodiment of the invention.

The operating system 340a operates the interaxial spacing in between the imaging devices of the Mx module 100.

The operating system 340b operates, depending on configurations, the relative or the specific inclination(s) (Y axis rotation) on the imaging devices of the Mx module 100.

At the end of the process's step 340, the Mx module 100 is capable of capturing a stereoscopic view in conformity with the invention, and to communicate it to the exploitation system 140.

The exploitation system 140 may be any system capable of collecting the data transmitted by the Mx module 100 and, depending on the embodiment of the invention, by the data recognition system 110, and of using them, for instance a recording system or a live broadcasting system. System 140 is always present in the scope of the invention.

According to some configurations of the invention, steps 350 and 360 (FIG. 1) are performed. In these cases the exploitation system 140 must have the ability to receive and uses the data transmitted by the data recognition system 110. These steps may be useful if, for instance, the user intends to facilitate other operating processes on the stereoscopic image, such as adding post-rendering visual effects that would be consistent with the spatial geometry of the stereoscopic image produced by the invention. With these data, he may for instance recreate a virtual Mx module 100 in accordance with the settings of the Mx module 100 involved in the generation of the exploited stereoscopic image, and so insert CG objects in the stereoscopic image while maintaining a compliance of the three-dimensional space of stereoscopic image resulting from this mixture. The configurations of the invention that incorporate these possibilities of post-production should be encouraged.

Executive summary of the a process flow of data in FIG. 1: One aspect of the invention allows, in the process of FIG. 1, the data recognition system 110 to see at any time the state of parameters settings on the Mx module 100 (step 300) and to communicate them to the controlling system 120 (step 310). Each time the controlling system 120 receives data from the data recognition system 110 (step 310), it performs the step 320 of the method in order to determine whether to send the operating system 130 new setting data. If this is case, it immediately processes the received data according to the method and generates output data (step 320) and transmits them to the operating system 130 (step 330).

Each time the operating system 130 receives adjusting data from the controlling system 120 (step 330), it immediately sets them in practice (step 340).

Each time the exploitation system 140 uses the stereoscopic image signal produced by the Mx module 100 according to the method, if it is fit to do so it collects (step 350) from data recognition system 110 the state of the settings found at this time on the Mx module 100 and use them (step 360).

In the event where the tools used to perform the invention or an embodiment of the invention are powerful enough to produce the various processes in a very short time, for instance in the case where high performance electromechanical systems and/or computers manage the performing of the method of FIG. 1, the method allows for instance to produce in real-time stereoscopic video sequences that can include camera and/or zoom movements and/or ambitious convergence plane changes while preserving a stable "background offset" likely able to avoid an unfortunate fatigue of humans eye muscles.

In some situations, such as when a CG software exploits the invention, all systems of the invention may be contained in a single and powerful enough personal computer.

Thus, when the invention is performed with a recognition system (110) capable of perfectly determining in real time the parameters used by the processes, for instance within a CG software, the invention is likely to reveal its full power since the user could certainly shoot his scene in stereo with almost as much flexibility as it would be with a single camera, and could then perform an infinite kind of shooting device and stage objets movements. His attention devoted to a beautiful stereoscopic shooting would then be primarily focused on aesthetic choices on positioning the convergence plane, leaving the invention to deliver automatically and in real-time the proper convergence angle and interaxial spacing for a comfortable and homogeneous stereoscopic vision, provided that the broadcasting conditions would be appropriate. In this sense, the background offset attribute should be consistent with the screen displaying the stereoscopic image in order to prevent the viewer from a great vision effort for objects located in the background of the stereoscopic image. A bad choice made by the recognition system 200 would therefore be due to an inappropriate choice made by the user about the tool used to ensure this part, that is an inappropriate use of the invention by a user due to, for instance, his misunderstanding of the proper use of the invention. The invention has been successfully tested by the inventor, and in a general way the defaults that would be observed on a stereoscopic image produced with the invention shall not constitute defects attributable to the invention.

This invention is innovating by enabling a great freedom of action that was previously inaccessible in stereoscopic image production of such quality.

All industries producing stereoscopic images are likely to find great interest in the use of the invention.

It is claimed:

1. A method for generating a stereoscopic image, comprising the following steps:
   get a stereoscopic shooting module consisting of a pair of imaging devices;
   determine the current values of focal length and image sensor's width set on first and second imaging device;
   determine the distance value between the shooting module and a distant subject matter chosen in the current scene to picture;
   choose a wished maximum horizontal offset value that shall be performed about that distant subject matter into the resulting stereoscopic image;
   determine the distance value between a wished convergence plane and the shooting module;
   determine at least one interaxial value, proper to define an interaxial positioning to be set on first and second imaging device, and at least one convergence value, proper to define a converging angular positioning to be set on first and second imaging device, from these said current values of focal length and image sensor's width, said distance value between the shooting module and the chosen distant subject matter said wished maximum horizontal offset value, said distance value between the wished convergence plane and the shooting module,
   set the said interaxial value(s) and the said convergence value(s) on first and second imaging device;
   then perform a synchronized imaging capture with first and second imaging device.

2. A stereoscopic image shooting system comprising:
   a stereoscopic shooting module consisting of a first imaging device (Lx) and a second imaging device (Rx);
   a data recognition system (110) comprising
     a focal length recognition system (240) recognizing the current value(s) of focal length set on first L(Lx) and second (Rx) imaging device,
     a sensor's width recognition system (250) recognizing the current value(s) of image sensor's width set on first (Lx) and second (Rx) imaging device,
     a distance recognition system (260) recognizing the value of distance between the shooting module and a distant subject matter chosen in the current scene to picture,
     a horizontal offset recognition system (200) collecting the value of maximum horizontal offset wished for that distant subject matter into the output stereoscopic image,
     a distance recognition system (210) recognizing the value of distance between a wished convergence plane and the shooting module,
   a controlling system (120), which uses values collected by the data recognition system (110) to determine at least one interaxial value, proper to define an interaxial positioning to be set on first (Lx) and second (Rx) imaging device, and at least one convergence value, proper to define a converging angular positioning to be set on first (Lx) and second (Rx) imaging device,
   an operating system (130), which sets the said interaxial and convergence positioning on first (Lx) and second (Rx) imaging device, in order to perform a synchronized imaging capture with first (Lx) and second (Rx) imaging device, and
   an exploitation system (140), which receives and uses the image signals output from this shooting.

3. Stereoscopic image shooting system of claim 2,
   wherein the data recognition system (110) further comprises one or more of the following recognition subsystems:
     a <<Delta Epsilon>> recognition system (280) determining a steadiness buffer value which is used, at the controlling system (120) processing level, to adjust the said interaxial and convergence output values,
     a mean (270) set up to assign at least one identifier to at least some elements among the stereoscopic shooting module, the data recognition systems, or their components, and to transmit the identifier(s) to the controlling system (120) in order to enable a selective treatment for at least one imaging device component,
     a mean (290) set up to define at least one hierarchical constraint, which is used, at least in part, at the controlling system (120) processing level,
     a spatial recognition system (230) recognizing at least one value proper to define the current location of at least one of first (Lx) and second (Rx) imaging device,
     an angular recognition system (220) recognizing at least one value proper to define the current angular positioning of at least one of first (Lx) and second (Rx) imaging device,
   while the controlling system (120) is further set to adjust the said interaxial and convergence output values, depending on, in part, one or more of this said buffer value, said identifier, said hierarchical constraint, and said location and angular values.

4. Stereoscopic image shooting system of claim 3, wherein the exploitation system (140) further receive at least some of the data output by the data recognition system (110) in order to allow direct or later use.

5. Stereoscopic image shooting system of claim 4, comprising at least two imaging devices, further set up to give form to, really or virtually, at least two distinct stereoscopic shooting modules, with sharing, a least in part, of at least one among the data recognition system (110), the controlling system (120), the operating system (130), and the exploitation system (140).

6. Plurality of stereoscopic image shooting systems of claim 4, set up to give form to, really or virtually, a stereoscopic image shooting system consisting of network of N distinct stereoscopic shooting modules (N≥1), with sharing of, at least in part, at least one among the imaging devices, the data recognition system (110), the controlling system (120), the operating system (130), and the exploitation system (140).

7. A stereoscopic image shooting system of either claim 2 to 6, wherein at least one distance recognition system (210), recognizing at least one said wished convergence plane distance value, is associated with at least one focussing mean, to interact so that at least one convergence plane position and at least one imaging device's focus distance are correlated.

8. Electronic controlling system (120) of a stereoscopic shooting module, performing the method of claim 1 in a very short time so that every involved processes are noticeably delivered in real-time, and comprising
  input means to collect variables expressing, at least, current values of focal length and image sensor's width set on the stereoscopic shooting module imaging devices, a distance value between the stereoscopic shooting module and a distant subject matter chosen in a scene to picture, a wished maximum horizontal offset value to be performed about said distant subject matter into the resulting stereoscopic image, and a distance value between the stereoscopic shooting module and a wished convergence plane, and
  processing means to determine, from these input variables, interaxial and convergence positioning output values to be set on the stereoscopic shooting modules imaging devices, and
  output means to deliver said outputs values.

9. Electronic controlling system of claim 8, further comprising:
  input mean(s) to collect one or more of the following data:
    a steadiness buffer value which is used, at the processing level, to adjust the said interaxial and convergence output values,
    at least one identifier proper to identify at least one data among the input data, in order to enable a selective treatment for at least one imaging device component,
    at least one hierarchical constraint, which is used, at least in part, at the processing level,
    at least one value proper to define the current location of at least one of first (Lx) and second (Rx) imaging device,
    at least one value proper to define the current angular positioning of at least one of first (Lx) and second (Rx) imaging device,
  processing means that adjust the said interaxial and convergence output values also depending on, in part, one or more of this said buffer value, said identifier, said hierarchical constraint, and said location and angular values.

10. Electronic controlling system of claim 9, wherein the input means, the processing means, and the output means, are further set up to perform at least the selective treatments of the features of, really or virtually, at least two distinct stereoscopic shooting modules.

11. Electronic controlling system of either claim 8 to 10, wherein at least one said wished convergence plane distance input variable is correlated with a focus distance value.

* * * * *